United States Patent
Moskwa et al.

(10) Patent No.: US 7,124,021 B2
(45) Date of Patent: Oct. 17, 2006

(54) ENGINE TESTING DEVICE WHICH SIMULATES DYNAMIC GAS EXCHANGE

(75) Inventors: John J. Moskwa, Madison, WI (US); John L. Lahti, Marquette, MI (US); Matthew W. Snyder, Manistee, MI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 11/063,923

(22) Filed: Feb. 23, 2005

(65) Prior Publication Data

US 2006/0190160 A1    Aug. 24, 2006

(51) Int. Cl.
*G01M 15/04* (2006.01)
(52) U.S. Cl. .................... 701/114; 73/117.1
(58) Field of Classification Search ............... None
See application file for complete search history.

(56) References Cited

U.S. PATENT DOCUMENTS 5,791,630 A * 8/1998 Nakao et al. .......... 251/129.15
6,561,014 B1 * 5/2003 Smith et al. .............. 73/117.1
6,708,557 B1    3/2004 Moskwa et al.

OTHER PUBLICATIONS

Lahti, John L. and Moskwa, John J., "A Transient Test System for Single Cylinder Research Engines with Real Time Simulation of Multi-Cylinder Crankshaft and Intake Manifold Dynamics," Mar. 2004, SAE (Society of Automotive Engineers) Paper 2004-01-0305.

* cited by examiner

*Primary Examiner*—Andrew M. Dolinar
(74) *Attorney, Agent, or Firm*—Craig A. Fieschko, Esq.; DeWitt Ross & Stevens S.C.

(57) ABSTRACT

A testing device allows a test engine (such as a single-cylinder test engine) to experience the air exchange characteristics of a multi-cylinder test engine having a greater number of cylinders. The test engine receives air from an air source (such as the atmosphere) through the interior passage of an air intake adapter, wherein valves on the passage walls separate the interior passage from a negative or positive pressure source. A processor (such as a computer) may actuate the valves to allow air to be pulled from the passage to simulate the effect of air intake into additional virtual cylinders (i.e., cylinders that would operate in tandem with the cylinder(s) of the test engine if the test engine had a greater number of cylinders), and/or to simulate the effect of forced air induction (i.e., turbocharging or supercharging).

20 Claims, 1 Drawing Sheet

THE FIGURE
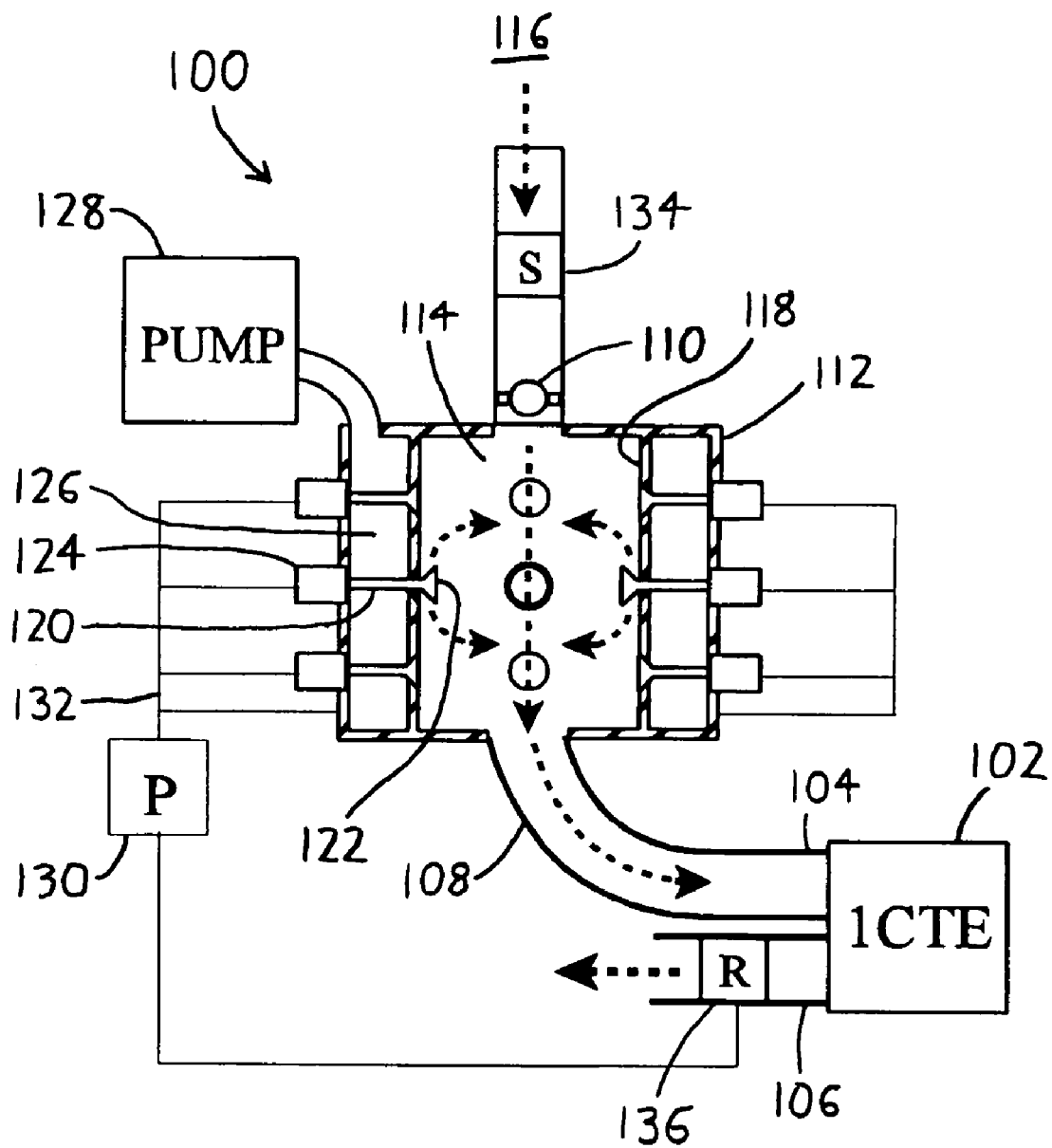

ENGINE TESTING DEVICE WHICH SIMULATES DYNAMIC GAS EXCHANGE

FIELD OF THE INVENTION

This document concerns an invention relating generally to devices and methods for measuring and testing engine characteristics, and more specifically to devices for modifying the gas exchange characteristics of internal combustion engines (e.g., the pressure, velocity, volumetric flow, flow profile, etc. of engine air intake).

BACKGROUND OF THE INVENTION

As discussed in (for example) U.S. Pat. No. 6,708,557 to Moskwa et al. (which is incorporated by reference herein, and thus should be regarded as a part of this document), the single-cylinder test engine (1CTE) has long been an important and widely-used tool in engineering and development of internal combustion engines. The 1CTE is typically a single cylinder, piston and head taken from a multi-cylinder engine (MCE), or having a design adapted from a MCE, and which is used to simulate performance of an MCE on a smaller and simpler scale. Since the 1CTE has only a single cylinder, it is generally much easier to install and use measurement instrumentation in a 1CTE than an MCE, thereby allowing more complete data collection regarding a cylinder's fluid dynamics, heat transfer, thermodynamics, emissions and other characteristics. Additionally, owing to the simpler design of 1CTEs, they are much less expensive and time-consuming to build and modify when working out design challenges associated with combustion chamber shape, timing, or other geometric and thermodynamic issues, or to experimentally validate theoretical/computational performance predictions.

However, 1CTEs also carry numerous drawbacks. The contributions of the missing cylinders are sometimes critical to accurate simulation of MCE performance. U.S. Pat. No. 6,708,557 describes the use of a high-bandwidth transient dynamometer wherein a processor (e.g, a computer, application specific integrated circuit, or other calculating device) simulates the inertial contribution of additional "virtual" cylinders added to a 1CTE, and causes the dynamometer to apply appropriate loads or energy inputs to the 1CTE such that the 1CTE behaves as if the virtual cylinders were physically present within the 1CTE (i.e., as if the 1CTE was a MCE).

However, while this system is extremely useful for adapting a 1CTE to simulate the inertial dynamics of an MCE, it has been found that the "missing cylinders" of the 1CTE also have other performance contributions that are usefully taken into account if the 1CTE is to fully represent MCE performance—in particular, the gas exchange characteristics of the 1CTE versus those of an MCE (i.e., the "breathing" of an engine, particularly during its intake and exhaust cycles). To illustrate, if a 1CTE is mounted on a production manifold (a manifold of a type that would actually be used with the MCE which the 1CTE is to represent), the intake valves of the 1CTE draw air from the manifold without experiencing any effects from the intake valves of other cylinders: the airflow dynamics of the manifold are almost entirely dependent on the intake of the 1CTE. In contrast, in an MCE, air is usually drawn into the intake ports of several cylinders at the same time, and thus the pressure, volumetric flow, etc. at the intake port of one of the cylinders is affected by the conditions at the intake ports of the other cylinders. The interaction between the intake ports has a substantial effect on the performance of each cylinder of the MCE, particularly during transient operation of the engine (i.e., at non-constant speed/load conditions). It would therefore be extremely useful to have available some means of modifying a 1CTE to experience the same gas exchange characteristics that the 1CTE would experience if the 1CTE was actually present as a part of an MCE, so that a 1CTE could more accurately simulate MCE performance.

BRIEF DESCRIPTION OF THE DRAWINGS

THE FIGURE schematically depicts an exemplary testing device 100 wherein a test engine 102 (e.g., a 1CTE) is to simulate the performance of an MCE having additional cylinders, with the test engine 102 receiving air from an air source 116 (here the atmosphere) through a throttle 110, an air intake adapter 112 (shown in cross-section), and a portion 108 of an engine mount (e.g., a manifold runner, also shown in cross-section), and wherein the air flow through the air intake adapter passage 114 is modified by the opening and closing of valves 120 (which separate the passage 114 from a source 128 of negative pressure). Thus, the processor 130 may actuate the valves 120 to allow air to be pulled from the passage 114 to simulate the effect of air intake into additional virtual cylinders (i.e., cylinders that would operate in tandem with the cylinder(s) of the test engine 102 if the test engine 102 was present in an MCE having a greater number of cylinders).

DETAILED DESCRIPTION OF PREFERRED VERSIONS OF THE INVENTION

The invention involves an engine testing device which is intended to at least partially solve the aforementioned problems. To give the reader a basic understanding of some of the advantageous features of the invention, following is a review of a preferred version of the device, with the claims set forth at the end of this document then defining the various versions of the invention in which exclusive rights are secured.

Referring to the accompanying drawing, a preferred version of the testing device is generally depicted by the reference numeral 100. An internal combustion test engine having at least one cylinder (e.g., a 1CTE) is schematically represented at 102, with the test engine 102 having at least one air intake port 104 through which air (and possibly vaporized fuel and/or exhaust or other gases) is admitted into the cylinder for combustion. The test engine 102 additionally has at least one exhaust port 106 through which exhaust gases may be expelled. The air intake port 104 of the test engine 102 is preferably connected to a manifold runner 108 which has a length and/or configuration similar to one that might be used with the MCE whose performance is being simulated (i.e., the runner 108 or other conduit leading to the air intake port 104 preferably simulates the gas dynamics that would be present in the MCE).

An air intake adapter, shown in cross-section at 112, then communicates and modulates the supply of air to the runner 108, and thus to the air intake port 104 of the test engine 102, so as to simulate the impact on the test engine 102 of air intake by one or more additional virtual cylinders (that is, cylinders which are not physically present—or are at least not operational—and whose performance alongside the cylinder(s) of the test engine 102 is to be simulated). The air intake adapter 112 includes a passage 114 communicating air from an air source 116 (here the atmosphere) to the runner 108 and the air intake port 104, with the passage 114 being bounded by passage walls 118 bearing one or more valves 120. The valves 120 (and passage walls 118) are situated between the passage 114 and a pressure source. Thus, when one or more of the valves 120 are actuated, additional air can be pulled from the passage 114 (if a negative pressure source is used) to simulate the intake effects of other (but absent) cylinders. Alternatively, if a positive pressure source is used, actuation of the valves 120 can supply additional air to the passage 114 to simulate the effect of forced induction (i.e., turbocharging or supercharging) or other means of airflow enhancement. In the exemplary air intake adapter 112 depicted in the drawing, the valves 120 are normally-closed poppets 122 actuated by fast-acting solenoids 124, with two of the valves 120 being shown in the open state so that vacuum (or pressurized air) in a chamber 126 bounded by the passage walls 118 may be communicated to the passage 114. The chamber 126 is supplied by a pressure source 128 (e.g., a pump), and if desired, a large-volume plenum (not shown) might be interposed between the pressure source 128 and the chamber 126 to better maintain a relatively uniform pressure supply to the chamber 126.

The valves 120 are preferably actuated in the following manner. A processor 130—i.e., a personal computer, application-specific integrated circuit, microcontroller, programmable logic controller, or other means for providing a desired actuation signal to the valves 120—communicates valve actuation signals to the valves 120 via lines 132. Where the test device 100 is to simulate the presence of additional virtual cylinders (e.g., where the test engine 102 is to simulate the presence of additional cylinders), these valve actuation signals are determined in accordance with the behavior of virtual intake valves: the intake valves that would be present in conjunction with the additional virtual cylinders if such virtual cylinders were operating in the test engine 102. In other words, the valves 120 are actuated to simulate the gas exchange that would be effected by the virtual intake valves of virtual cylinders if such virtual components were operating in the test engine 102. (Again, in this case a negative pressure source 128, such as a vacuum pump, is used.) If the test device 100 is to simulate the presence of forced air induction or other sources of additional air input, a positive pressure source 128 is used and the valves 120 are actuated to allow the input of the amount of air appropriate to simulate turbocharging, supercharging, etc.

In summary, to use the testing device 100 to simulate the presence of additional cylinders, the processor 130 is programmed to simulate the behavior of one or more virtual cylinders operating in tandem with the test cylinder(s) of the test engine 102. As the test engine 102 is operated at desired speed/load conditions, the processor 130 adapts the behavior of the virtual cylinders accordingly, and adapts the opening of one or more of the valves 120 to withdraw air from the passage 114 (assuming a negative pressure source 128) in the same manner that air would be withdrawn from the intake valves of the virtual cylinders if they were in fact physically present. Alternatively, if the pressure source 128 has pressure greater than that of the air source 116, the openings of the valves 120 are adapted to simulate the effect of forced induction or other air input to the test engine 102 (usually as if the test engine 102 was included within an MCE). Note that while the air intake adapter 112 is depicted with three rows of valves 120, and with the central row being open and the others closed, different numbers of valves 120 at different locations may be opened, by varying degrees and at different times, in order to achieve the desired degree of gas exchange. An airflow mass sensor 134 is preferably provided upstream from the throttle 110 to provide a measure of the air provided to the test engine 102 from the air source 116 (or from other sources other than from the air intake adapter 112), though such mass sensors 134 may be provided in other or additional locations as well.

It should be understood that an exemplary version of the invention has been described to illustrate preferred features and applications of the invention, but the invention is not limited to these preferences. As an example, while the air intake adapter 112 cross-sectionally depicted in the drawings takes a form similar to a drum with double cylindrical walls radially bounding the chamber 126, and with the valves 120 being situated on the inner chamber wall 118, it should be understood that the air intake adapter 112 may take a wide variety of other configurations instead, may include varying numbers of valves 120 arrayed in different patterns, and may include valves 120 of types other than normally closed solenoid-actuated poppet valves (i.e., valves of the poppet, spool, gate, ball, etc. types, whether normally open or normally closed, could be used). All that is necessary is that the air traveling in the passage 114 be adapted to mimic desired gas exchange effects, e.g., that air be removed so as to simulate the effect of air intake of other absent virtual cylinders, and/or that air be added to simulate the effect of forced induction.

It is also possible that the chamber 126 might be divided into different sections, with at least one section communicating with a negative pressure source and at least one section communicating with a positive pressure source, such that actuation of selected valves will pull and/or add air to the passage 114 as desired. This could be useful, for example, when simulating the effects of backflow from the test engine 102 (i.e., the situation where its intake valve is opened while its cylinder pressure is still high), since the effect of backflow can be simulated by pulling air from the passage 114. It is also possible that the air source 116 supplying the passage 114 might be at other than atmospheric pressure, and the valves 120 could be used to vary the pressure of the air supplied to the test engine 102 about the pressure of the air source 116 (as will be discussed below).

To illustrate a possible alternative version of the invention, the version 100 shown in the accompanying drawing might be modified to close the passage to the air source 116 (removing the illustrated airflow sensor 134 and throttle 110). The pressure source 128 could then be used to supply all of the air to the test engine 102, with the processor 130 and valves 120 modulating the air supply to the test engine 102 to simulate the manifold pressure of an MCE (or to simulate some other effect). In this case, it may be desirable to provide the airflow sensor 134 somewhere along the airflow path so that airflow to the engine 102 can be monitored for measurement and/or feedback purposes. The pressure source 128 could be open to the atmosphere, or could otherwise simply provide atmospheric pressure. If this version of the invention does use an atmospheric pressure source 128, the outer walls of the chamber 126 could be removed if desired since there is no need to isolate the chamber 126 from the atmosphere.

Further, the testing device 100 is suitable for the testing of engines other than 1CTEs; for example, it could be used in conjunction with a 2-cylinder engine to simulate the gas exchange characteristics of an engine having 3 or more cylinders. It could also be used with a test engine 102 having any number of cylinders, not to simulate the presence of additional cylinders, but to allow testing of the test engine 102 with modified gas exchange characteristics. As an example, an MCE (or 1CTE) might be tested with the air intake adapter 112 having its valves 120 actuated to simulate resonant effects in some actual or desired manifold (in which case the depicted runner 108 might be provided as a part of an actual multi-runner production manifold). In this respect, also note that the air intake adapter 112 might be provided upstream from the throttle 110 rather than downstream, such that the air intake adapter 112 receives air from the air source 116 and then supplies the air to the throttle 110 and the air intake port 104. Similarly, the air intake adapter 112 might be provided downstream from any intake port components (i.e., from any runner 108, manifold, or subcomponents thereof) rather than upstream, such that the air intake adapter 112 receives air from the intake port components and then supplies the air to the air intake port 104. Various components other than those described above might also or instead be provided upstream or downstream from the air intake adapter 112.

Additionally, while the foregoing discussion focused on use of the air intake adapter 112 for simulating gas exchange at the intake port(s) 104 of a test engine 102, it could also or alternatively be used downstream from one or more exhaust ports to modify back pressure on the test engine 102, thereby simulating different exhaust conditions.

When simulating the effects of forced induction (turbocharging or supercharging) on the test engine 102, a positive pressure source 128 would be used (supplying a pressure greater than atmospheric) to pump air into the passage 114 of the adapter 112. The adapter 112 would preferably have its input end closed rather than leading to the atmosphere 116, so that the air supplied to the runner 108 and engine 102 is restricted to positive pressure. Yet another possibility is to replace the air source 116 with a source of air at positive gage pressure rather than at atmospheric pressure, and the adapter 112 can be used to modulate this positive pressure supply to simulate the impact of forced air induction. The throttle 110 may be left upstream from the adapter 112 to simulate "pull-through" induction (i.e., charging occurs downstream from the throttle 110), or may instead be situated downstream from the adapter 112 to simulate "blow-through" induction (i.e., charging occurs upstream from the throttle 110). In the latter case, the throttle 110 may be moved between the adapter 112 and the runner 108 (or more simply, the arrangement shown in the accompanying drawing can be modified such that the adapter 112 is moved upstream from the throttle 110, and also preferably the mass flow sensor 134, so that the adapter 112 and its pressure source 128 effectively take the place of the air source 116). Regardless of the arrangement used, the processor 130 could then actuate the valves 120 to simulate the effects of the forced induction system. This processor 130 might in this case also control one or more components 136 in the exhaust system 106 of the test engine 102 in order to restrict the exhaust flow to simulate exhaust components of the simulated forced induction system (e.g., the exhaust-driven turbine of a turbocharger). The restriction/component 136 could be a turbine controlled by processor 130, a device similar to the air intake adapter 112, one or more valves, or other devices. When the testing and experimentation to be performed by the testing device 100 is not concerned with exhaust effects, the exhaust restriction 136 might not be present. In similar fashion, when testing and experimentation is not concerned with intake effects such as the effects of additional "virtual valves," the effects of forced induction, the effects of different manifold configurations, etc., the exhaust restriction 136 might be present but the air intake adapter 112 might be absent upstream from the test engine 102.

While the processor 130 is shown having lines 132 in communication with the air intake adapter 112 and the exhaust restriction 136, it should be understood that the processor 130 could (and often would) also be in communication with other components as well, such as the pump 128, the mass flow sensor 134, data loggers, etc.

The invention is not intended to be limited to the versions described above, but rather is intended to be limited only by the claims set out below. Thus, the invention encompasses all different versions that fall literally or equivalently within the scope of these claims.

What is claimed is:

1. An engine testing device comprising:
  a. an internal combustion engine including:
    (1) at least one engine cylinder, and
    (2) an air intake port through which air is admitted into the engine cylinder for combustion;
  b. an air intake adapter including:
    (1) passage walls which define a passage opening onto an air source, wherein the passage supplies air from the air source to the air intake port;
    (2) valves provided along the passage walls, the valves being situated between:
      i. the passage, and
      ii. a pressure source having a different pressure than the air source,
      wherein the actuation of one or more of the valves exposes the passage to the pressure source;
  c. a processor which actuates one or more of the valves, thereby affecting the pressure of air supplied by the air source to the air intake port.

2. The engine testing device of claim 1 wherein the processor actuates one or more of the valves in accordance with the behavior of at least one virtual cylinder of the internal combustion engine, wherein each virtual cylinder:
  a. is not physically present in the internal combustion engine, and
  b. simulates the performance of an actual cylinder present in the internal combustion engine and operating in conjunction with the engine cylinder.

3. The engine testing device of claim 1 wherein:
  a. the pressure source has higher pressure than the air source, whereby the pressure source forces air into the passage; and
  b. the processor actuates one or more of the valves to simulate the effect of forced air induction on the internal combustion engine.

4. The engine testing device of claim 1 wherein the pressure source has lower pressure than the air source, whereby the pressure source draws air from the passage.

5. The engine testing device of claim 1 wherein the pressure source provides vacuum to the valves.

6. The engine testing device of claim 1 wherein the pressure source has higher pressure than the air source, whereby the pressure source supplies air to the passage.

7. The engine testing device of claim 1 wherein the passage walls are interposed between:
  a. the passage, and
  b. a pressure source plenum in communication with the pressure source,
  whereby opening the valves opens the pressure source plenum to the passage.

8. The engine testing device of claim 1 wherein the valves are ordinarily closed.

9. The engine testing device of claim 1 wherein the valves are actuated by solenoids.

10. The engine testing device of claim 1 wherein the valves are poppet valves.

11. The engine testing device of claim 1 wherein one or more of the following internal combustion engine intake port components is situated between the air intake adapter and the internal combustion engine:
   a. a runner;
   b. a plenum; and
   c. a throttle.

12. An engine testing device comprising:
   a. an internal combustion engine including:
      (1) at least one engine cylinder, and
      (2) an air intake port through which air is admitted into the engine cylinder for combustion;
   b. a processor generating virtual valve output which is representative of the gas intake of at least one virtual cylinder of the internal combustion engine, wherein each virtual cylinder:
      (1) is not physically present in the internal combustion engine, and
      (2) simulates the performance of an actual cylinder present in the internal combustion engine and operating in conjunction with the engine cylinder;
   c. a passage communicating air from an air source to the air intake port;
   d. one or more valves in the passage, the valves being actuated in response to the virtual valve output.

13. The engine testing device of claim 12 wherein the valves are not actuatable to obstruct the flow of air between the air source and the air intake port.

14. The engine testing device of claim 12 wherein the valves are interposed between the passage and a pressure source, wherein the pressure source has different pressure than the air source.

15. The engine testing device of claim 12 wherein the valves are interposed between:
   a. the passage, and
   b. a pressure source plenum, the pressure source plenum being in communication with a pressure source at a different pressure than the air source.

16. The engine testing device of claim 12 wherein the valves are interposed between the passage and a pressure source, wherein the pressure source is at or near vacuum pressure.

17. The engine testing device of claim 12 wherein the valves are ordinarily closed.

18. The engine testing device of claim 12 wherein one or more of the following internal combustion engine intake port components is situated between the passage and the air intake port:
   a. a runner;
   b. a plenum; and
   c. a throttle.

19. An engine testing device comprising:
   a. an air intake adapter including:
      (1) passage walls which define a passage extending between:
         i. an air source and
         ii. an engine mount whereupon internal combustion engine intake port components may be situated,
         whereby the passage conveys air from the air source to any internal combustion engine intake port components situated on the mount;
      (2) valves provided along the passage walls, the valves being situated between:
         i. the passage, and
         ii. a pressure source having a different pressure than the air source,
         wherein the actuation of one or more of the valves exposes the passage to the pressure source;
   b. a processor generating virtual valve output which is representative of the gas intake of at least one cylinder of an internal combustion engine;
   wherein the valves of the air intake adapter are actuated in response to the virtual valve output.

20. The engine testing device of claim 19 wherein the internal combustion engine intake port components include one or more of:
   a. a runner;
   b. a plenum; and
   c. a throttle.

* * * * *